UNITED STATES PATENT OFFICE.

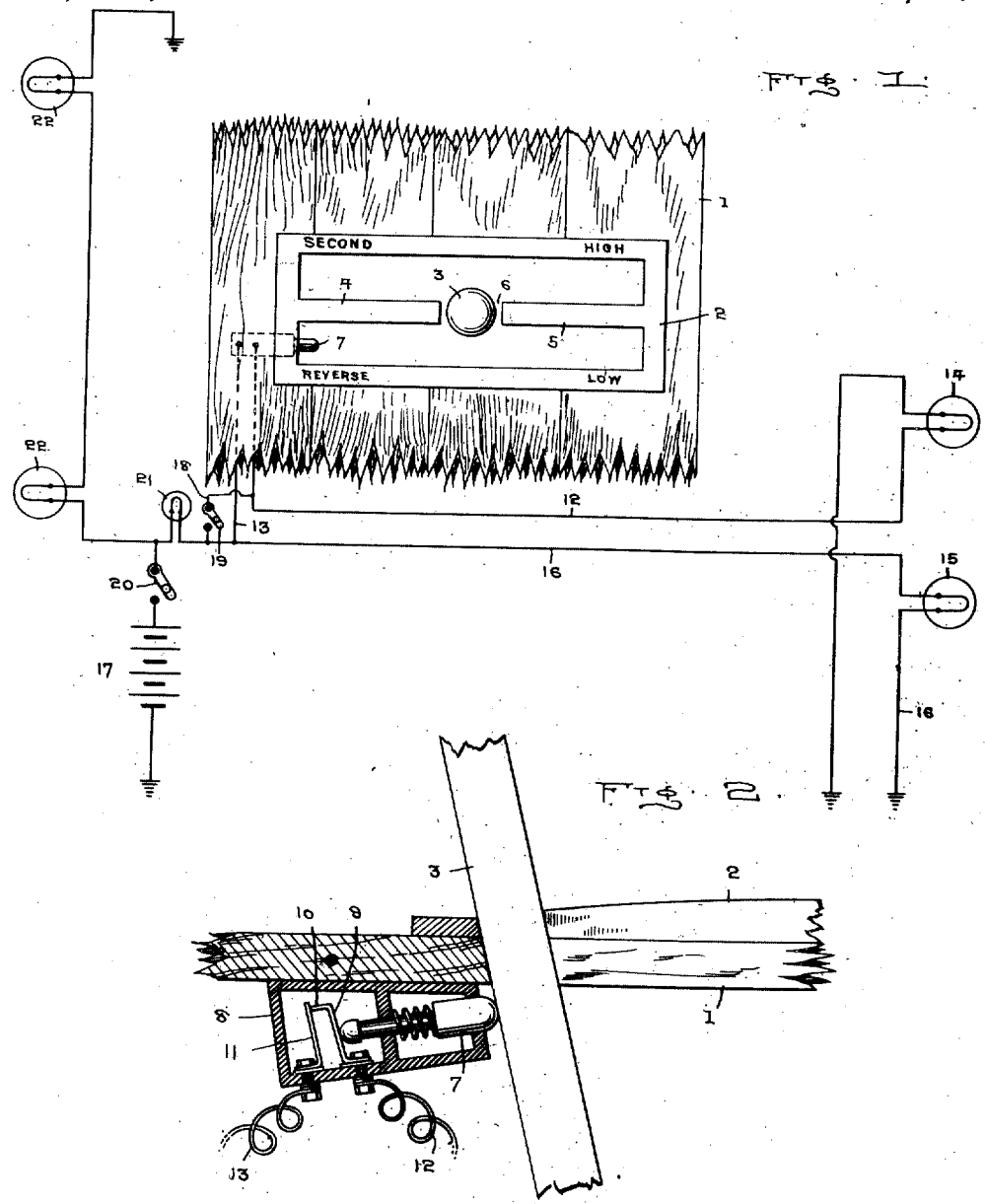

GEORGE GORDON STEWART, OF ROSEBURG, OREGON.

LIGHTING SYSTEM FOR VEHICLES.

1,212,836.  Specification of Letters Patent.  Patented Jan. 16, 1917.

Application filed July 20, 1915. Serial No. 40,849.

*To all whom it may concern:*

Be it known that I, GEORGE GORDON STEWART, a citizen of the United States, residing at Roseburg, in the county of Douglas and State of Oregon, have invented certain new and useful Improvements in Lighting Systems for Vehicles; and I do hereby declare the following to be a full, clear, and exact description of the invention, such as will enable others skilled in the art to which it appertains to make and use the same.

My invention relates to new and useful improvements in lighting systems for vehicles and more particularly to motor propelled vehicles, and my object is to provide means for automatically closing an electric circuit by the movement of certain parts of the gear shifting mechanism of the vehicle whereby a warning light will be displayed in the rear of the vehicle in addition to the ordinary tail light.

A further object is to provide means for manually closing the circuit of the warning light independently of the gear shifting mechanism. And a further object is to connect the circuit for the warning light with the circuit of the ordinary tail light of the vehicle.

Other objects and advantages will be hereinafter set forth and more particularly pointed out in the accompanying specification.

In the accompanying drawings which are made a part of this application, Figure 1 is a detail plan view of a bottom portion of a vehicle showing the gear shifting lever and the circuit for the lighting mechanism in diagram, and Fig. 2 is a vertical detail sectional view of the circuit closing mechanism in connection with a part of the gear shifting mechanism.

Referring to the drawings in which similar reference numerals designate corresponding parts throughout the several views, 1 indicates the floor of the vehicle body to which is attached the usual form of guide plate 2 used in connection with the gear shifting mechanism, the gear shifting lever 3 extending upwardly through openings in said plate, the arms 4 and 5 extending inwardly from the ends of the plate 2 forming guides for the lever.

When the lever 3 is positioned in the space 6, between the ends of the arms 4 and 5, or as shown in Fig. 1 of the drawings, the gears are in neutral position and to change the speed of the vehicle, by shifting the lever to the right and moving the same forwardly or rearwardly, the gear will be thrown into second speed or high respectively, while if the lever is thrown to the left and moved forwardly, the mechanism will be thrown into reverse gear and if moved rearwardly, the mechanism will be thrown into low gear.

In order to display a bright warning light in the rear of the vehicle when the gearing is thrown into reverse, a plunger 7 is positioned at the forward end of the opening, into which the lever is placed to reverse the gear of the machine and in such position as to be engaged by the lever and moved longitudinally through a housing 8, the opposite end of the plunger engaging a contact plate 9 and forcing the angular end 10 thereof into engagement with the contact plate 11, thereby closing the circuit between the electric wires 12 and 13 which are attached respectively to the contact plates 9 and 11. The wire 12 is extended to the rear of the vehicle and to a warning lamp 14 which is preferably of the ordinary head light type so as to give a brilliant light in the rear of the machine, said wire after leaving the lamp 14 being grounded in the usual or any preferred manner. In order to connect the lamp 14 with the same circuit employed for lighting the usual form of tail light 15, the wire 13 is attached to the wire 16 which connects the tail light 15 with any suitable form of battery 17, and in order to provide a single line current, the wire 16 is grounded from the lamp 15, while the battery 17 is likewise grounded. By attaching the warning lamp 14 in the same circuit with the tail light 15 in the manner shown, the use of the lamp 14 will in no manner interfere with the tail light 15 for although the lamp 14 obtains its circuit from the same source as the light 15, they are in no manner related with each other.

In order to operate the warning lamp 14 independently of the gear shifting mechanism, a wire 18 is tapped into the wire 16 forwardly of the wire 13 and has its opposite end connected to the wire 12 between the lamp 14 and contact plate 9, said wire 18 passing through a hand switch 19 so that said switch can be manually operated to close the circuit through the lamp 14 without passing it through the contact plates 9 and 11. It is understood of course that the switch 19 is normally open and is only to be used in case of emergency as when a rear warning light is needed at times other than when the shifting lever is in reverse, as for instance, when it is necessary to bring the vehicle to a sudden stop.

A switch 20 is introduced between the battery and the wire 16 to entirely cut off the current from the tail light 15 and the warning lamp 14 when desired and when said switch 20 is open, the lever 3 may be thrown into reverse position without affecting the warning lamp 14 as when the vehicle is being operated in the day time. In addition to the two rear lamps a dash lamp 21 may be provided in the line 16, and if desired, the head lights 22 may be attached to the battery and controlled in any suitable manner.

While I have shown the circuit closing mechanism so positioned as to be operated by the gear shifting lever, I wish it distinctly understood that the circuit closing device can be attached to any suitable part of the gear shifting mechanism or rather in a position to be operated thereby.

It will thus be seen that I have provided an automatic means for closing an electric circuit to create a warning light in the rear of the vehicle and in view of the simplicity of this device it can be readily attached to vehicles at a minimum expense and can be attached to any vehicle having electricity for lighting purposes. It will also be seen that in view of the brilliancy of the warning light, accidents will be avoided and any one in the rear of the vehicle will be given warning that the vehicle intends to move rearwardly or has come to a sudden stop.

Having thus fully described my invention what I claim as new and desire to secure by Letters Patent of the United States is:—

An automatic circuit closing mechanism adapted to be actuated by the lever of the gear shifting mechanism of a vehicle, comprising a housing adapted to be secured to the under side of the bottom of the vehicle, and provided with a partition wall, a straight contact plate secured upon the bottom of and within said housing adjacent the front end wall thereof, a second contact plate also secured upon the bottom of and within said housing adjacent the partition wall within said housing and provided with an angularly disposed contact end or finger, said contact plates being connected with a suitable source of electrical supply and disposed in spaced parallel relation to each other with the contact end of said second contact plate being normally out of contact with the first contact plate, a plunger rod formed with an enlarged elongated head slidably mounted in the rear end wall of said housing and provided with a rounded end projecting outwardly therethrough, the reduced portion of said plunger rod being slidably mounted through the partition wall of said housing and having a button upon its projecting end adapted to engage said second contact plate, and a compression spring interposed between said partition wall and said head and surrounding the reduced portion of said plunger rod for normally holding the same outwardly in the path of said lever, whereby when said lever is moved against said plunger rod the same will be forced inwardly for causing the contact of said contact plates for closing a circuit.

In testimony whereof I have signed my name to this specification in the presence of two subscribing witnesses.

GEORGE GORDON STEWART.

Witnesses:
L. W. HICKS,
NATHAN FULLERTON.